US011900791B2

(12) United States Patent
Ganesan et al.

(10) Patent No.: US 11,900,791 B2
(45) Date of Patent: Feb. 13, 2024

(54) SELF-TESTING FIRE SENSING DEVICE FOR CONFIRMING A FIRE

(71) Applicant: Honeywell International Inc., Charlotte, NC (US)

(72) Inventors: Kamal Raja Ganesan, Chennai (IN); Barath Murugavel, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/729,434

(22) Filed: Apr. 26, 2022

(65) Prior Publication Data

US 2023/0343204 A1 Oct. 26, 2023

(51) Int. Cl.

*G08B 29/04* (2006.01)
*G08B 17/06* (2006.01)
*G08B 17/107* (2006.01)
*G08B 29/20* (2006.01)

(52) U.S. Cl.

CPC ........... *G08B 29/043* (2013.01); *G08B 17/06* (2013.01); *G08B 17/107* (2013.01); *G08B 29/20* (2013.01)

(58) Field of Classification Search

CPC .... G08B 29/043; G08B 17/06; G08B 17/107; G08B 29/20

See application file for complete search history.

(56) References Cited

U.S. PATENT DOCUMENTS 4,195,286 A 3/1980 Galvin
4,617,560 A 10/1986 Gutmann
10,522,031 B2 12/2019 Nalukurthy et al.
11,024,154 B1 * 6/2021 Lang ...................... G08B 29/24
11,127,284 B1 9/2021 Barson et al.
11,132,891 B2 * 9/2021 Dearden .............. G08B 17/103
(Continued)

FOREIGN PATENT DOCUMENTS

CN 110517439 B * 4/2021 ........... G08B 17/103
EP 1777670 B1 1/2009

OTHER PUBLICATIONS

Killeen, et al., "Alternative Calibration Process for Optical Smoke Detectors"; Aug. 23, 2012 (57 pgs) https://digital.WPI.edu/pdfviewer/x633f278m.

*Primary Examiner* — Curtis A Kuntz
*Assistant Examiner* — James E Munion
(74) *Attorney, Agent, or Firm* — Brooks, Cameron & Huebsch, PLLC

(57) ABSTRACT

Devices, methods, and systems for a self-testing fire sensing device are described herein. One device includes a fan, an optical scatter chamber configured to measure a quantity of particles therein, and a controller configured to compare the quantity to a baseline quantity and transmit a command to a fan responsive to the quantity being greater than the baseline quantity, wherein the fan is configured to activate for a particular period of time to remove particles from the optical scatter chamber responsive to receiving the command, wherein the optical scatter chamber is configured to measure the quantity of particles therein after the particular period of time, and wherein the controller is configured to compare the quantity of particles after the particular period of time to the baseline quantity and report a confirmed fire responsive to the quantity of particles after the particular period of time being greater than the baseline quantity.

20 Claims, 4 Drawing Sheets

(56) References Cited

U.S. PATENT DOCUMENTS

| | | | | |
|---|---|---|---|---|
| 2010/0085195 | A1 | 4/2010 | Bennett | |
| 2012/0235822 | A1* | 9/2012 | Barson | G08B 17/113 340/630 |
| 2019/0113494 | A1 | 4/2019 | Desjardins | |
| 2020/0320844 | A1* | 10/2020 | Buchholz | G08B 29/24 |
| 2022/0058929 | A1 | 2/2022 | Dearden et al. | |

* cited by examiner

SELF-TESTING FIRE SENSING DEVICE FOR CONFIRMING A FIRE

TECHNICAL FIELD

The present disclosure relates generally to devices, methods, and systems for a self-testing fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Maintaining the fire alarm system can include regular cleaning and testing of fire sensing devices mandated by codes of practice in an attempt to ensure that the fire sensing devices are functioning properly. However, since tests may only be completed periodically, there is a risk that faulty fire sensing devices may not be discovered quickly or that tests will not be carried out on all the fire sensing devices in a fire alarm system.

Testing each fire sensing device can be time consuming, expensive, and disruptive to a business. For example, a maintenance engineer is often required to access fire sensing devices which are situated in areas occupied by building users or parts of buildings that are often difficult to access (e.g., elevator shafts, high ceilings, ceiling voids, etc.). As such, the maintenance engineer may take several days and several visits to complete testing of the fire sensing devices, particularly at a large site. Additionally, it is often the case that many fire sensing devices never get tested because of access issues.

Over time a fire sensing device can become dirty with dust and debris. A clogged fire sensing device can prevent air and/or particles from passing through the fire sensing device to sensors in the fire sensing device, which can prevent a fire sensing device from detecting smoke, fire, and/or carbon monoxide.

In some instances, a fire sensing device can mistake dust for smoke and trigger a false alarm. False alarms can decrease trust in the fire alarm system and minimize actions taken in the event of a real fire because people are accustomed to the fire sensing device raising false alarms. False alarms can put undue burden on maintenance engineers who must check triggered fire sensing devices. Also, equipment (e.g., manlifts) used by the maintenance engineers to check triggered fire sensing devices may succumb to unnecessary wear due to false alarms.

DETAILED DESCRIPTION

Figure 1:
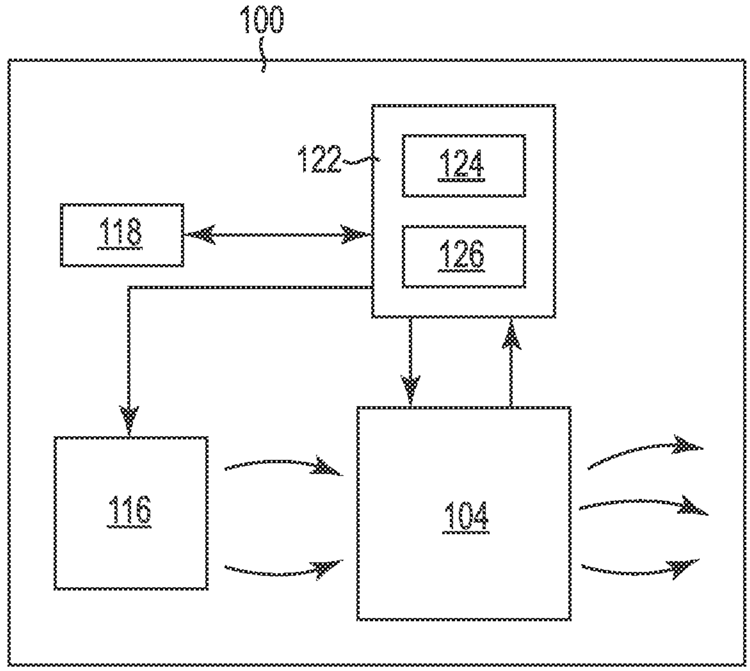
FIG. 1 illustrates a block diagram of a dual smoke detection function of a self-testing fire sensing device in accordance with an embodiment of the present disclosure.

Devices, methods, and systems for a self-testing fire sensing device (e.g., fire sensing device) are described herein. One fire sensing device includes a fan, an optical scatter chamber configured to measure a quantity of particles therein, and a controller configured to compare the quantity to a baseline quantity and transmit a command to a fan responsive to the quantity being greater than the baseline quantity, wherein the fan is configured to activate for a particular period of time to remove particles from the optical scatter chamber responsive to receiving the command, wherein the optical scatter chamber is configured to measure the quantity of particles therein after the particular period of time, and wherein the controller is configured to compare the quantity of particles after the particular period of time to the baseline quantity and report a confirmed fire responsive to the quantity of particles after the particular period of time being greater than the baseline quantity.

In contrast to previous fire sensing devices in which a person (e.g., maintenance engineer and/or operator) would have to manually verify a fire detected by a fire sensing device, fire sensing devices in accordance with the present disclosure can perform dual smoke detection to confirm a fire. The fire sensing device can utilize a fan to remove particles from an optical scatter chamber responsive to detecting particles. Dust particles and smoke particles can be removed from the optical scatter chamber by the fan, but unlike dust particles, smoke particles will return shortly after the fan is turned off. Accordingly, fire sensing devices in accordance with the present disclosure may confirm a fire without manual verification by a person if the fire sensing device detects particles again after the fan is turned off.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a dual smoke detection function of a fire sensing device 100 in accordance with an embodiment of the present disclosure. The fire sensing device 100 includes a controller (e.g., microcontroller) 122, a sounder 118, an optical scatter chamber 104, and a fan 116.

The controller 122 can include a memory 124 and a processor 126. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to confirm a fire in accordance with the present disclosure. For instance, processor 126 can execute the executable instructions stored in memory 124 to measure a quantity of particles in the optical scatter chamber 104, compare the quantity of particles to a baseline quantity, transmit a command to the fan 116 responsive to the quantity being greater than the baseline quantity, activate the fan 116 for a particular period to remove particles from the optical scatter chamber 104 responsive to receiving the command, measure the quantity of particles in the optical scatter chamber 104 after the particular period of time, compare the quantity of particles after the particular period of time to the baseline quantity, and report a confirmed fire responsive to the quantity of particles after the particular period of time being greater than the baseline quantity. In some examples, the controller 122 can report a false alarm responsive to the quantity of particles after the particular period of time being less than or equal to the baseline quantity.

The controller 122 can activate the sounder 118 responsive to the quantity of particles after the particular period of time being greater than the baseline quantity and/or responsive to the quantity of particles measured prior to transmitting the command to the fan 116 being greater than the baseline quantity. If the sounder 118 was activated responsive to the quantity of particles measured prior to transmitting the command to the fan 116 being greater than the baseline quantity, the controller 122 can deactivate the sounder 118 responsive to the quantity of particles after the particular period of time being less than or equal to the baseline quantity.

The memory 124 can store the baseline quantity, the previously measured quantity of particles, and/or the quantity of particles after the particular period of time (e.g., quantity of particles measured responsive to activating the fan 116). In some examples, the previously measured quantity can be stored in memory 124 as the baseline quantity if, for example, the previously measured quantity is the first (e.g., initial) measured quantity in the fire sensing device 100. If the fire sensing device 100 already has a baseline quantity, then the previously measured quantity can be stored in memory 124 as a previously measured quantity.

Figure 2:
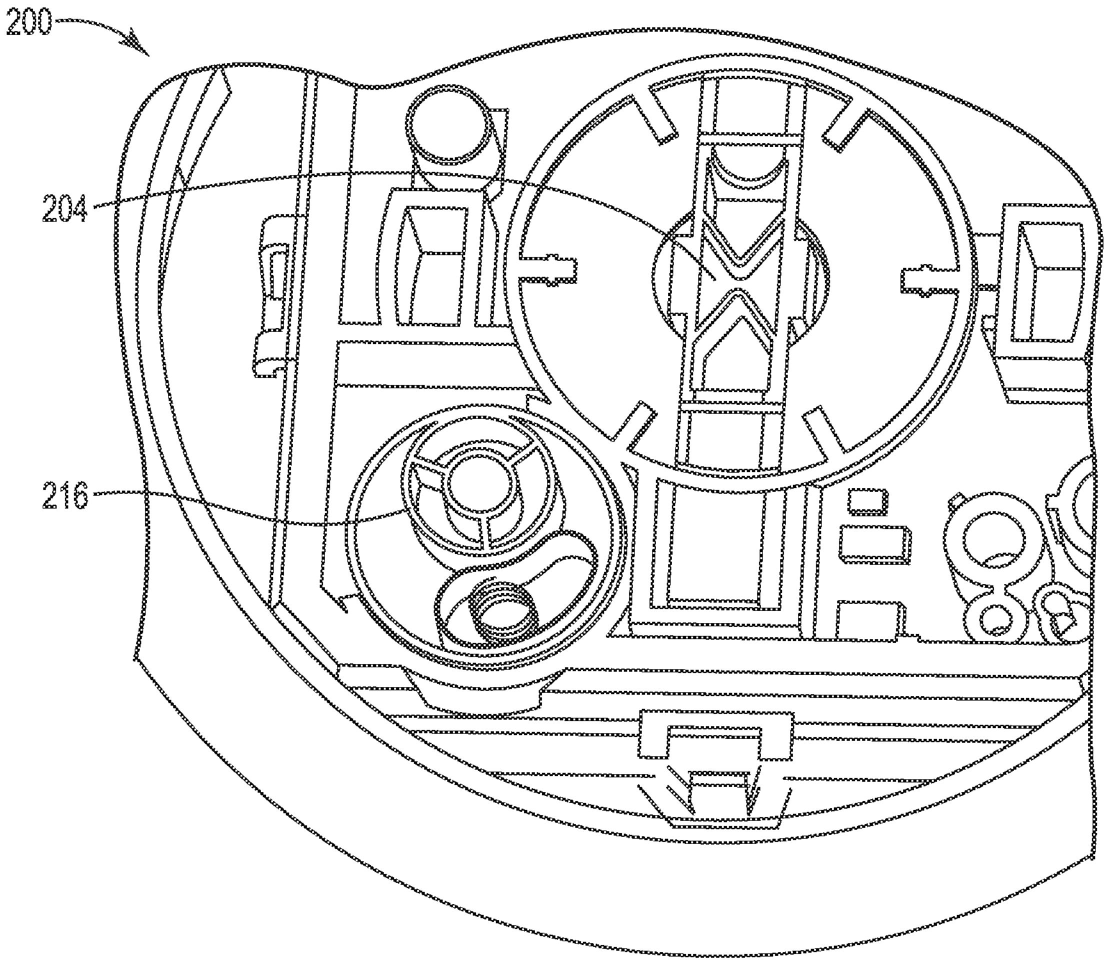
FIG. 2 illustrates a portion of an example of a self-testing fire sensing device in accordance with an embodiment of the present disclosure.

FIG. 2 illustrates a portion of an example of a fire sensing device 200 in accordance with an embodiment of the present disclosure. The fire sensing device 200 can correspond to the fire sensing device 100 of FIG. 1 and can be, but is not limited to, a fire and/or smoke detector of a fire control system.

A fire sensing device 200 can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

As shown in FIG. 2, fire sensing device 200 can include an optical scatter chamber 204 and a fan 216, which can correspond to the optical scatter chamber 104 and the fan 116 of FIG. 1, respectively. Although a fan 216 is illustrated in FIG. 2, any device capable of removing dust from the optical scatter chamber 204 can be used. For example, a variable airflow generator or a shaker device could be used instead of and/or in combination with fan 216.

The fan 216 can control the airflow through the fire sensing device 200, including the optical scatter chamber 204. For example, the fan 216 can move particles, gases, and/or aerosol from a first end of the fire sensing device 200 to a second end of the fire sensing device 200. The fan 216 can start responsive to a command and can stop responsive to a command and/or after a particular period of time.

A fire sensing device 200 can automatically or upon command perform dual smoke detection contained within the fire sensing device 200. The dual smoke detection can confirm a fire without inspection by a person or verification by another fire sensing device. The dual smoke detection can include measuring a quantity of particles in the optical scatter chamber 204, comparing the quantity of particles to a previously measured quantity of particles in the optical scatter chamber 204, activating the fan 216 to remove particles from the optical scatter chamber 204 responsive to the quantity of particles being greater than the previously measured quantity of particles, deactivating the fan 216, measuring the quantity of particles in the optical scatter chamber 204 responsive to deactivating the fan, comparing the quantity of particles measured responsive to deactivating the fan 204 to the previously measured quantity of particles, reporting a confirmed fire responsive to the quantity of particles measured responsive to deactivating the fan 204 being equal to or greater than the previously measured quantity of particles, and reporting a false alarm responsive to the quantity of particles measured responsive to deactivating the fan being less than the previously measured quantity of particles.

Figure 3:
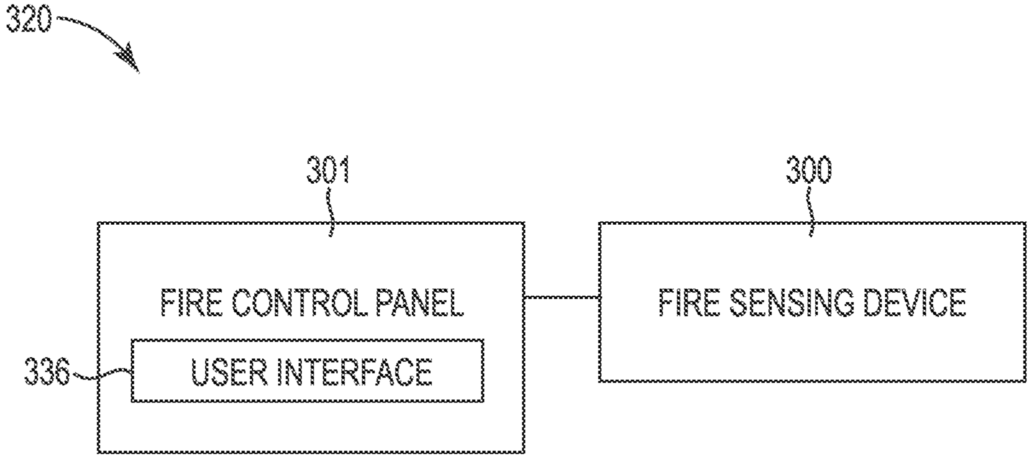
FIG. 3 illustrates a block diagram of a dual smoke detection function of a fire alarm system in accordance with an embodiment of the present disclosure.

FIG. 3 illustrates a block diagram of a dual smoke detection function of a fire alarm system 320 in accordance with an embodiment of the present disclosure. The fire alarm system 320 can include a fire sensing device 300 and a fire control panel 301. Fire sensing device 300 can be, for example, fire sensing device 100 and/or 200 previously described in connection with FIGS. 1 and 2, respectively.

The fire control panel 301 can be a monitoring device, a fire detection control system, and/or a cloud computing device of the fire alarm system 320. The fire control panel 301 can be configured to send commands to and/or receive reports from a fire sensing device 300 via a wired or wireless network. For example, the fire sensing device 300 can report a confirmed fire to the fire control panel 301 responsive to a quantity of particles after a particular period of time being greater than a baseline quantity, report an unconfirmed fire to the fire control panel 301 responsive to the quantity of particles measured prior to transmitting the command to fan (e.g., fan 116 and/or 216 of FIGS. 1 and 2, respectively) being greater than the baseline quantity, and/or report a false alarm to the fire control panel 301 responsive to the quantity of particles measured responsive to deactivating the fan being less than the previously measured quantity of particles.

The fire control panel 301 can receive reports from a number of fire sensing devices analogous to fire sensing device 300. For example, the fire control panel 301 can receive reports from each of a number of fire sensing devices analogous to fire sensing device 300 and transmit commands based on the reports from each of the number of fire sensing devices.

In a number of embodiments, the fire control panel 301 can include a user interface 336. The user interface 336 can be a GUI that can provide and/or receive information to and/or from a user and/or the fire sensing device 300. The user interface 336 can display messages and/or data received from the fire sensing device 300. For example, the user interface 336 can alert a user to an unconfirmed fire, a confirmed fire, and/or a false alarm reported by the fire sensing device 300.

The networks described herein can be a network relationship through which fire sensing device 300 and/or fire control panel 301 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from and transmit information to fire sensing device 300 and/or fire control panel 301 via a wired or wireless network.

As used herein, a "network" can provide a communication system that directly or indirectly links two or more computers and/or peripheral devices and allows a fire control panel to access data and/or resources on a fire sensing device 300 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

In some examples, the network can be used by the fire sensing device 300 and/or the fire control panel 301 to communicate with a computing device. The computing device can be a personal laptop computer, a desktop computer, a mobile device such as a smart phone, a tablet, a wrist-worn device, and/or redundant combinations thereof, among other types of computing devices. The computing device can receive reports from a number of fire sensing devices analogous to fire sensing device 300 and/or a number of fire control panels analogous to fire control panel 301 and transmit commands based on the reports to one or more of the number of fire sensing devices and/or one or more of the number of fire control panels.

Figure 4:
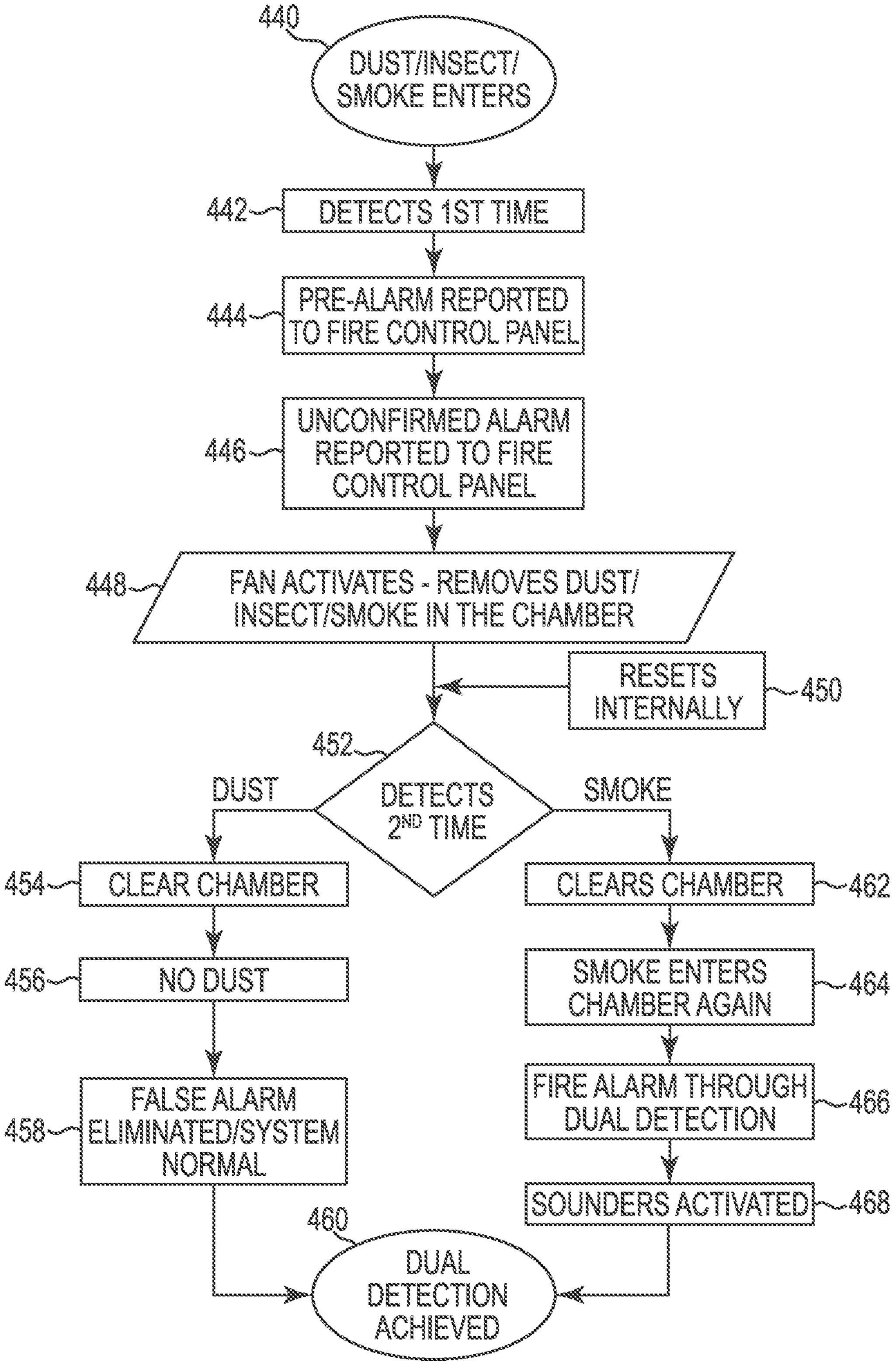
FIG. 4 is a flow chart associated with confirming a fire using a self-testing fire sensing device in accordance with an embodiment of the present disclosure.

FIG. 4 is a flow chart associated with confirming a fire using a fire sensing device in accordance with an embodiment of the present disclosure. In some embodiments, the steps of the flow chart illustrated in FIG. 4 can be performed by the fire sensing device, previously described in connection with FIGS. 1, 2, and/or 3. At 440, dust, an insect, and/or smoke can enter the fire sensing device.

The fire sensing device can detect the dust, insect, and/or smoke as particles at 442. For example, an optical scatter chamber (e.g., optical scatter chamber 104 and/or 204 of FIGS. 1 and 2, respectively) can be configured to measure a quantity of particles inside the optical scatter chamber of the fire sensing device. In a number of embodiments, the optical scatter chamber can include a transmitter light-emitting diode (LED) and a receiver photodiode to measure the quantity of particles within the optical scatter chamber.

The fire sensing device can report a pre-alarm to the fire control panel (e.g., fire control panel 301 of FIG. 3) at 444. The fire sensing device can report the pre-alarm responsive to the quantity of particles being greater than zero and/or greater than a threshold quantity of particles. The pre-alarm can be displayed as a pre-alarm on a user interface (e.g., user interface 336 of FIG. 3) of the fire control panel.

At 446, the fire sensing device can report an unconfirmed fire to the fire control panel. The fire sensing device can report the unconfirmed fire to the fire control panel responsive to the quantity of particles being greater than the previously measured quantity of particles that triggered the pre-alarm. The unconfirmed fire can be displayed on the user interface of the fire control panel. In some examples, the fire control panel can transmit a command to the fire sensing device responsive to receiving the report of the unconfirmed fire.

The fire sensing device can activate a fan (e.g., fan 116 and/or 216 of FIGS. 1 and 2, respectively) to remove the dust, insect, and/or smoke in the optical scatter chamber at 448. In some examples, the fire sensing device can activate the fan responsive to a command from the fire control panel. The fan can activate for a particular period of time responsive to receiving the command. Other devices, instead of or in combination with the fan, can be used to remove particles from the fire sensing device. For example, a variable airflow generator or a shaker device could be used to remove particles.

At 450, the fire sensing device can reset internally. Resetting the fire sensing device allows the fire sensing device to detect particles again. Many existing fire sensing devices are only configured to detect once.

The fire sensing device can detect particles again at 452 responsive to resetting the fire sensing device at 450. The optical scatter chamber can continuously or periodically measure the quantity of particles inside the fire sensing device.

At 454, the fire sensing device can determine dust is clear from the optical scatter chamber. For example, the quantity of particles measured inside the fire sensing device can be zero or below a threshold quantity of particles at 454.

After the dust is cleared and/or a particular period of time has passed, if the optical scatter chamber does not detect particles, the fire sensing device can determine there is no dust at 456. Unlike smoke, which can take minutes or seconds to return to the fire sensing device, dust can take days, weeks, and/or years to accumulate to a level at which the fire sensing device will trigger a false alarm. Accordingly, if the optical scatter chamber does not detect particles and/or does not detect particles above a threshold after a particular period of time, the fire sensing device can determine the event was a false alarm.

At 458, a false alarm can be eliminated and a fire alarm system (e.g., fire alarm system 320 of FIG. 3) can be set to normal. For example, the fire sensing device can report a false alarm responsive to a quantity of particles measured responsive to deactivating the fan being less than or equal to a previously measured quantity of particles and/or a quantity of particles after a particular period of time being less than or equal to a baseline quantity. In a number of embodiments, the user interface of the fire control panel can alert a user to the false alarm reported by the fire sensing device.

The smoke is clear from the optical scatter chamber at 462. For example, the quantity of particles measured inside the fire sensing device can be zero or below a threshold quantity of particles at 462.

At 464, the smoke enters the optical scatter chamber again. Smoke, unlike dust, can reenter the fire sensing device within minutes or seconds once the fan has stopped removing particles from the optical scatter chamber.

The fire sensing device can detect smoke for a second time through dual smoke detection and trigger a fire alarm at 466. The fire alarm can include reporting a confirmed fire responsive to a quantity of particles measured responsive to deactivating the fan being greater than a baseline quantity. A user interface of the fire control panel can alert a user to the confirmed fire reported by the fire sensing device.

At 468, sounders (e.g., sounder 118 of FIG. 1) can be activated in response to the fire sensing device detecting smoke for the second time. For example, the sounders can be activated responsive to the quantity of particles after a particular period of time being greater than a baseline quantity. The sounder can be included in or separate from the fire sensing device. In some examples, the sounder can be one of a number of output devices activated in response to the fire sensing device detecting smoke for the second time. Other output devices can include an air vent, a relay, a door, or an elevator, for example.

An output device can be activated by a command from the fire control panel and/or the fire sensing device. In a number of embodiments, the fire control panel can transmit a command to an output device to perform an output event responsive to receiving the report of the confirmed fire. The output device can perform the output event responsive to receiving the command from the control panel and/or transmit a notification that the output device performed the output event to the fire control panel responsive to performing the output event.

Dual smoke detection can be achieved at 460 in response to the fire sensing device performing a first particle detection at 442, activating the fan to remove particles from the optical scatter chamber at 448, and then performing a second particle detection at 452. Dual detection enables Fire sensing devices to confirm a fire without manual verification by a person.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A self-testing fire sensing device, comprising:
a fan;
an optical scatter chamber configured to measure a quantity of any dust or smoke particles therein prior to the fan activating; and
a controller configured to:
compare the measured quantity to a baseline quantity; and
transmit a command to the fan responsive to the measured quantity being greater than the baseline quantity; and
wherein the fan is configured to activate for a particular period of time to remove any dust or smoke particles from the optical scatter chamber responsive to receiving the command;
wherein the optical scatter chamber is configured to measure a quantity of smoke particles therein after the particular period of time; and
wherein the controller is configured to:
compare the quantity of smoke particles after the particular period of time to the baseline quantity; and
report a confirmed fire responsive to the quantity of smoke particles after the particular period of time being greater than the baseline quantity.

2. The device of claim 1, wherein the controller is configured to report an unconfirmed fire to a fire control panel responsive to the measured quantity measured prior to transmitting the command to the fan being greater than the baseline quantity.

3. The device of claim 2, wherein the controller is configured to receive a command from the fire control panel responsive to reporting the unconfirmed fire.

4. The device of claim 1, wherein the controller is configured to report the confirmed fire to a control panel.

5. The device of claim 1, further comprising a sounder.

6. The device of claim 5, wherein the controller is configured to activate the sounder responsive to the quantity of smoke particles after the particular period of time being greater than the baseline quantity.

7. The device of claim 5, wherein the controller is configured to activate the sounder responsive to the measured quantity measured prior to transmitting the command to the fan being greater than the baseline quantity.

8. The device of claim 7, wherein the controller is configured to deactivate the sounder responsive to the quantity of smoke particles after the particular period of time being less than or equal to the baseline quantity.

9. The device of claim 1, wherein the controller is configured to report a false alarm responsive to the quantity of smoke particles after the particular period of time being less than or equal to the baseline quantity.

10. A method of operating a self-testing fire sensing device, comprising:

measuring a quantity of any dust or smoke particles in an optical scatter chamber prior to activating a fan of the self-testing fire sensing device;

comparing the measured quantity to a previously measured quantity of particles in the optical scatter chamber;

activating the fan to remove any dust or smoke particles from the optical scatter chamber responsive to the measured quantity being greater than the previously measured quantity of particles;

deactivating the fan;

measuring a quantity of smoke particles in the optical scatter chamber responsive to deactivating the fan;

comparing the quantity of smoke particles measured responsive to deactivating the fan to the previously measured quantity of particles;

reporting a confirmed fire responsive to the quantity of smoke particles measured responsive to deactivating the fan being equal to or greater than the previously measured quantity of particles; and reporting a false alarm responsive to the quantity of smoke particles measured responsive to deactivating the fan being less than the previously measured quantity of particles.

11. The method of claim 10, further comprising storing the previously measured quantity of particles in memory.

12. The method of claim 10, further comprising storing the quantity of smoke particles measured responsive to activating the fan in memory.

13. The method of claim 10, comprising receiving a command to perform dual smoke detection prior to measuring the quantity of any dust or smoke particles.

14. A fire control system, comprising:

a self-testing fire sensing device configured to:

measure a quantity of any dust or smoke particles in an optical scatter chamber of the self-testing fire sensing device prior to activating a fan of the self-testing fire sensing device;

compare the measured quantity to a baseline quantity; and transmit a report of an unconfirmed fire responsive to the measured quantity; and a control panel configured to:

receive the report of the unconfirmed fire; and transmit a command to the self-testing fire sensing device to activate the fan of the self-testing fire sensing device responsive to receiving the report of the unconfirmed fire.

15. The system of claim 14, wherein the self-testing fire sensing device is configured to:

activate the fan responsive to receiving the command;

measure a quantity of smoke particles in the optical scatter chamber responsive to the fan activated;

compare the quantity of smoke particles measured responsive to the fan being activated to the baseline quantity; and transmit a report of a confirmed fire responsive to the quantity of smoke particles measured responsive to the fan being activated being greater than the baseline quantity.

16. The system of claim 15, wherein the control panel is configured to receive the report of the confirmed fire.

17. The system of claim 16, further comprising an output device, wherein the control panel is configured to transmit a command to the output device to perform an output event responsive to receiving the report of the confirmed fire.

18. The system of claim 17, wherein the output device is an air vent, a relay, a sounder, a door, or an elevator.

19. The system of claim 17, wherein the output device is configured to:

perform the output event responsive to receiving the command from the control panel; and transmit a notification that the output device performed the output event to the control panel responsive to performing the output event.

20. The system of claim 15, further comprising a computing device, wherein the computing device is configured to receive the report of the confirmed fire.

* * * * *